United States Patent [19]
Ambler et al.

[11] 3,723,815
[45] Mar. 27, 1973

[54] ELECTRONIC CIRCUIT PROTECTIVE DEVICE

[75] Inventors: E. Curtis Ambler, Newington; Andrew E. Scoville, Ellington; Walter R. Bush, West Simsbury, all of Conn.

[73] Assignee: The Stanley Works, New Britain, Conn.

[22] Filed: June 5, 1972

[21] Appl. No.: 259,765

Related U.S. Application Data

[63] Continuation-in-part of Ser. No. 101,748, Dec. 28, 1970, Pat. No. 3,668,471.

[52] U.S. Cl..............317/18 D, 317/27 R, 317/33 SC
[51] Int. Cl...............................................H02h 3/28
[58] Field of Search.................317/33 SC, 18 D, 27 R

[56] References Cited

UNITED STATES PATENTS

| | | | |
|---|---|---|---|
| 3,324,352 | 6/1967 | Hover | 317/33 SC |
| 3,408,558 | 10/1968 | Peterson et al. | 317/33 SC |
| 3,566,189 | 2/1971 | Wilson et al. | 317/18 D |
| 3,525,903 | 8/1970 | Morris et al. | 317/18 D |
| 3,668,471 | 6/1972 | Ambler et al. | 317/18 D |

Primary Examiner—James D. Trammell
Attorney—Peter L. Costas

[57] ABSTRACT

A protective circuit device for connection between an associated electrical power supply and an associated electrical load which detects faults in the current drawn by the load. A solid state switch in the protective device is rendered conductive or non-conductive in response to an input signal produced by a signal generating means. The amplified signal from a current fault sensing means is applied to the gate of a silicon controlled rectifier which terminates the signal of the signal generating means maintaining one of the states of the solid state switch to open the circuit controlled thereby.

In the several embodiments, the protection device detects excessive current drawn by the load, or electrical leakage from the load by means of a differential transformer which produces an error signal when there is current imbalance between conductors from the line supply, or both. The preferred solid state switch is a triac, and desirably solid state switches couple both sides of the output and input terminals.

20 Claims, 6 Drawing Figures

ELECTRONIC CIRCUIT PROTECTIVE DEVICE

REFERENCE TO RELATED APPLICATION

This application is a continuation in part of our copending application Ser. No. 101,748 filed Dec. 28, 1970, granted as U.S. Pat. No. 3,668,471 on June 6, 1972.

BACKGROUND OF THE INVENTION

Increasing use of electrical power for many diverse applications along with increasing concern about hazards associated with such use has produced requirements for detection and control of excess current flow and leakage from electrically powered devices. Conventional circuit breakers provide an "overload" portion adapted to provide circuit interruption when there is a continuous current flow at a moderate level above the nominal rating of the circuit breaker and, in addition, a "short circuit" trip portion designed instantaneously to interrupt a circuit if it detects a current flow considerably above the nominal rating. Generally such devices are mechanical in nature with moving parts which are relatively slow moving and have a reliability factor less than that provided by presently available static switching devices. Moreover, such protective devices that do have "overload" and "short circuit" protection generally do not include protection against line-to-ground leakage paths when the current flowing is less than the nominal rating of the device.

Considerable difficulty has also been experienced with devices providing only one of these forms of protection because there is a continuing danger of electrocution as well as fire since any one of these types of circuit malfunction constitutes a hazard and may exist without one of the other types.

The utilization of circuit protective devices having both forms of protection adjacent the load is desirable to provide circuit protection while minimizing interruption of power to other devices, and such placement is particularly important where the device includes ground fault protection in order to provide a system which avoids nuisance tripping problems. When ground fault devices are used at a panel board or switchboard to limit ground fault current, the cumulative leakage of the various electrical devices connected to that branch circuit often results in a ground fault trip although no one of the devices has leakage sufficient to be hazardous. If the set point of the ground fault protection device is raised to a sufficient level to allow current flow and avoid nuisance tripping, the leakage from a particular device may be hazardous to personnel or likely to cause fire or explosion although the higher branch circuit ground fault limit has not yet been reached. Utilization of devices having the several features adjacent individual loads as opposed to placement in branch circuits carrying a plurality of devices has been deterred in large part because of the relatively high initial and operating costs for devices heretofore known and/or because of the size involved for the mechanical elements heretofore employed most generally in such devices.

The development of solid state circuit elements has permitted miniaturization in some electrical and electronic devices. Protective circuit devices have traditionally employed mechanical operating elements because of the necessity of ensuring fail-safe operation although efforts have been made to utilize solid state devices in conjunction with mechanical components.

It is an object of the present invention to provide a novel electrical protective circuit device utilizing a solid state line switch which is capable of responding reliably to a current fault in excess of a desired level and which may be manufactured and operated at low cost to facilitate use in an electrical circuit adjacent the electrical load.

It is a specific object to provide such a protective device which senses a current overload and responds rapidly thereto.

It is also an object to provide such a protective circuit device which also is capable of sensing very small ground faults producing a leakage of current to ground below the overload current rating of the device.

Another object is to provide such a protective circuit device which may be simply and economically constructed and adjusted to open a circuit in response to dangerous ground fault conditions while avoiding nuisance tripping.

A further object is to provide such a device having a very rapid circuit opening action to insure the protection will be provided quickly enough to prevent electrocution and to minimize the likelihood of fire or explosion, and which is fail-safe in design to minimize the impact of component failure.

SUMMARY OF THE INVENTION

It has now been found that the foregoing and related objects can be readily attained in a protective circuit device for detection and control of leakage from an associated electrical load and/or excessive current flow from a line power supply to an associated electrical load including a pair of terminals for connection to an external associated alternating current line power supply and a second pair of terminals for connection to an external associated load. There are means connecting each of the first pair of terminals to a corresponding terminal of the second pair including at least one solid state switch connecting one of the first pair of terminals and one of the second pair of terminals, and the solid state switch has conductive and nonconductive states. Means for changing the prevailing state of the solid state switch is provided which includes means generating an input signal, which is transmittable to the solid state switch to maintain one of such states, and the state of the solid state switch changes upon termination of the input signal. There is included means for sensing a fault in current flowing between at least one connected pair of terminals and operative to produce a signal upon a fault in current flow above a value established by the nominal rating of the protective circuit device. Means is connected to the fault sensing means responsive to a signal from the current fault sensing means when the fault is in excess of the value resulting from current drawn by the load in excess of the nominal rating of the protective circuit device and is operative to terminate the input signal. As a result, a current fault of predetermined level will produce an operating signal and the responsive means will terminate the input signal to change the state of the solid state switch to open the circuit controlled thereby. The responsive means for terminating the input signal and thereby changing the prevailing state of the solid state switch includes a selectively conductive silicon controlled rectifier to terminate the input signal and prevent generation of the input signal, and which latches in the signal terminating state.

The fault sensing means desirably utilizes a current transformer having a core of magnetically susceptible metal, and only a single primary winding connected in series between one of the first pair of terminals and one of the second pair of terminals, and a secondary winding. The secondary winding provides an output during operation which is a function of current flow in the primary winding and below a value established by the nominal rating of the protective circuit device. The responsive means is connected to the secondary winding and is responsive to an output in excess of the value resulting from current drawn by the load in excess of the nominal rating.

Preferably, the means connected to the secondary winding operates substantially instantaneously upon occurrence of an output substantially in excess of the nominal rating and, upon occurrence of an output in excess of the nominal rating of lesser magnitude, only after a relatively extended period of time. Most desirably the means connected to the secondary winding includes a resistance and a capacitance connected in parallel relationship and a second adjustable resistance to permit adjustment of the value of the output which will operate the means to terminate the input signal.

Desirably, the means connected to the secondary winding includes a rectifier and one stage of solid state amplification. A second solid state switch preferably is connected between the other of the first pair of terminals and other of the second pair of terminals, with the second solid state switch having conductive and nonconductive states depending upon the means for changing the prevailing state of the first-mentioned solid state switch.

The solid state switches may be triacs and the means generating an input signal may comprise an unijunction transistor oscillator. The means generating an input signal may include a bridge rectifier for rectifying the associated alternating current line power supply.

In its most desirable aspect, the protective circuit device will include ground fault detection capabilities. As such, it will incorporate a differential transformer having a core of magnetically susceptible metal, a pair of like primary windings disposed about the core, each of the primary windings being connected in series between one of the first pair of terminals and one of the second pair of terminals. The pair of primary windings under balanced current conditions therein produces a balanced total magnetomotive force so that the net magnetic flux in the core is zero. Under leakage current conditions, the pair of primary windings produce an unbalanced magnetomotive force to create a voltage in the secondary winding of the differential transformer. Means responsive to the voltage in the secondary winding of the differential transformer terminates the input signal, whereby the state of the solid state switch may be changed to open the circuit controlled thereby.

DETAILED DESCRIPTION OF THE ILLUSTRATED EMBODIMENTS

Figure 1:
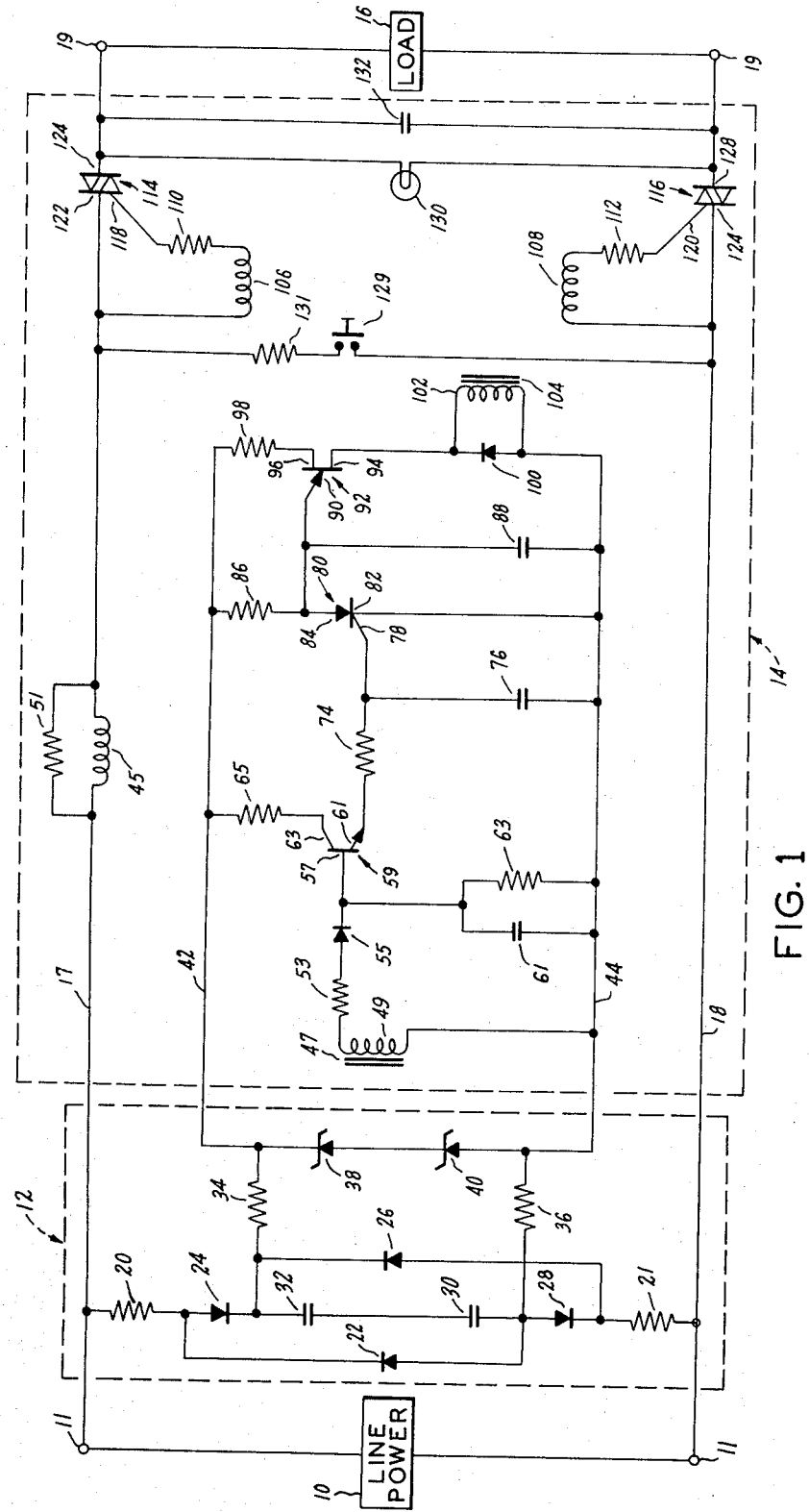
FIG. 1 is a circuit diagram of a protective circuit device embodying the present invention.

Turning now in detail to FIG. 1 of the attached drawing, therein illustrated is a source of alternating current line power 10 and a load 16 connected in series relation to a protective circuit device embodying the present invention. The device has a pair of input terminals 11 for the protective circuit power supply 12, and a sensing and isolation circuit generally designated by the numeral 14. Conductors 17, 18 provide a current flow path for line power between the input terminals 11 and a pair of output terminals 19 across which the load 10 is connected.

The power supply 12 includes resistors 20, 21 connecting the line power to a bridge rectifier including diodes 22, 24, 26, 28. The resistor 36 is connected to the common junction of diodes 22 and 28, and the resistor 34 is connected to the common junction points of diodes 24 and 26 which are connected to zener diodes 38, 40 to provide voltage regulation of the bridge output. The zener diodes 38, 40 are connected in series to provide voltage regulation which may be precisely established and which is not significantly affected by changes in input voltage or junction temperature. The rectified and regulated voltage output of the power supply 12 is carried by conductors 42, 44 to the sensing and isolation circuit 14.

Interposed in the line conductor 17 is a current transformer primary winding 45, which is would about a core 47 and cooperates with the current transformer secondary winding 49; as will be appreciated, the output of a secondary winding is a function of the current flow in the primary winding and thus in the line conductor 17. A resistor 50 is connected in parallel with the primary winding 45 for apportioning current in the conductor 17 so as to reduce the requirements for the current transformer primary winding 45, to lower the line losses, to conveniently adjust sensitivity and to conveniently lower the current levels for design of the associated trigger circuits. On one side of the secondary winding 49 is connected the conductor 44 and on the opposite side thereof are connected the resistor 53 and the diode 55, which are connected in series with the base 57 of the transistor indicated generally by the numeral 59.

Connected in parallel between the potential of base 57 and the conductor 44 is a network consisting of the capacitor 61 and the resistor 63 which provide a desired time versus current relationship; more specifically, the charging and discharging of the capacitor 61 as affected by current flow through the resistor 63 to the conductor 44 varies the signal applied to base 57. When the critical level signal on base 57 is reached, the transistor 59 will transmit a signal from the emitter 61 thereof to the resistor 74 and thence to the gate 78 of a silicon controlled rectifier (SCR) 80.

The collector 63 of the transistor 59 is connected to the conductor 42 by means of the resistor 65 which limits the current flowing thereto. The resistor 74 controls the current supplied to the gate 78 of the SCR 80 and the capacitor 76 connected between the gate 78 and the conductor 44 eliminates spurious noise spikes. The SCR 80 has a cathode 82 which is connected to the conductor 44 and an anode 84 which is connected in series with the resistor 86 to the conductor 42.

Connected to the anode 84 of SCR 80 are the filter or capacitor 88 and the emitter 90 of the unijunction transistor generally designated by the numeral 92. The unijunction transistor 92 has a first base 94 connected to the pulse transformer primary winding 102, which has connected across it a diode 100 for wave shaping. The second base 96 of the transistor 92 is connected to the conductor 42 through the resistor 98 which controls biasing of the unijunction transistor 92.

The transformer primary winding 102 is disposed about the core 104 and cooperates with the secondary windings 106 and 108 which are in turn connected through the resistors 110, 112 to the gates 118, 120 of the triacs generally designated by the numerals 114, 116. The terminals 122, 124 of the triac 114 are interposed in conductor 17, and a signal operating on the gate 118 will render the material of the triac between the terminals 112, 124 conducting or nonconducting depending upon the arrangement employed. Similarly, the terminals 124, 128 of the triac 116 are interposed in conductor 18 and the material therebetween is rendered conducting or non-conducting by the signal applied to the gate 120. An indicator light 130 is connected across conductors 17, 18 to sense the condition of the triacs 114, 116, i.e., whether they are conducting. The capacitor 132 is positioned in parallel to the indicator light 130 and the load 16 is connected between the terminals 19, 19 of the conductors. 17, 18.

Testing is effected by means of the momentary push button switch 129 connected in series with the resistor 131 between conductors 17, 18 to establish a momentary current flow path whereby current flows through current transformer primary winding 45. The resistor 131 limits the maximum current draw during the test operation.

Figure 2:
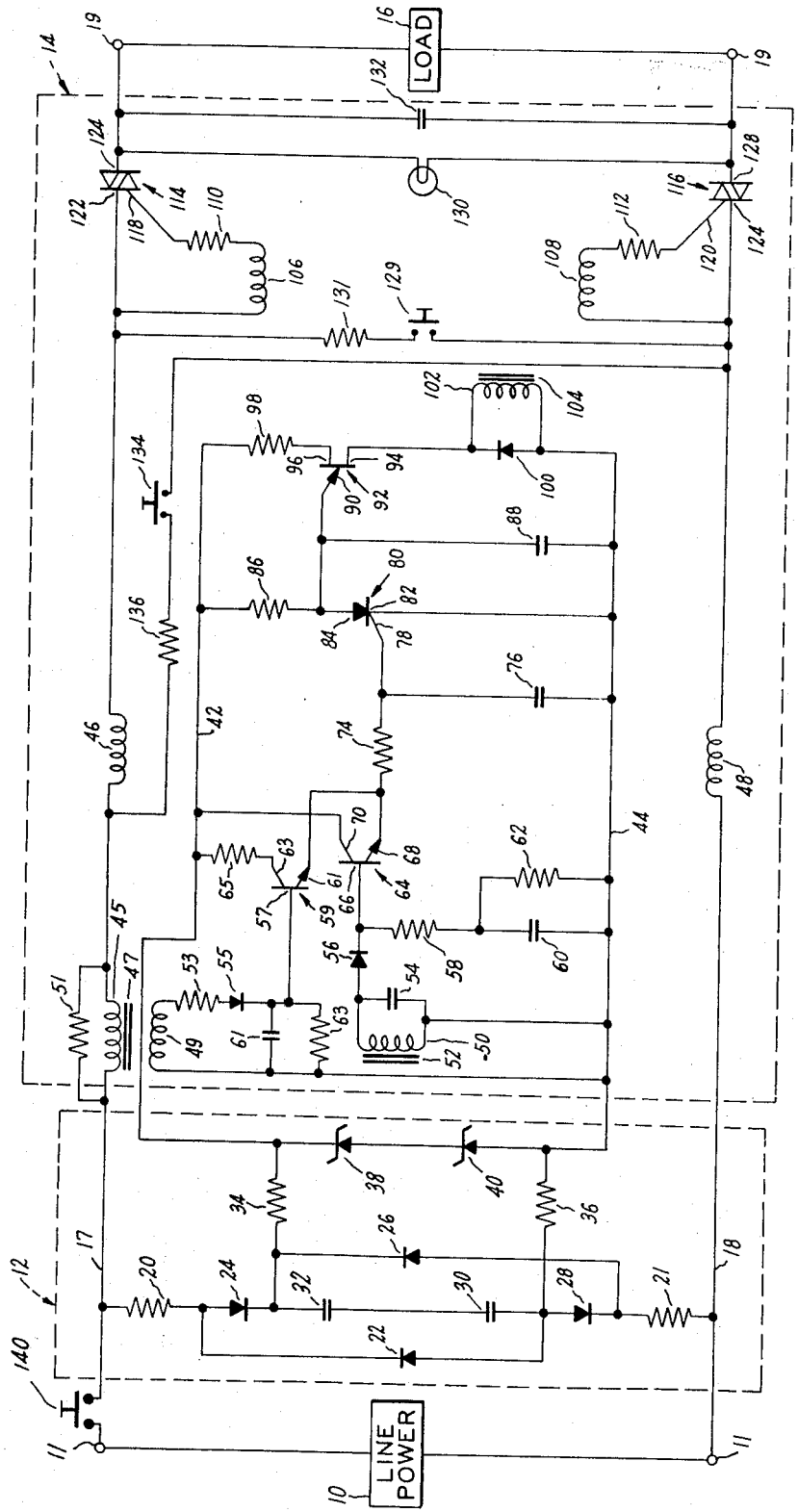
FIG. 2 is a circuit diagram of another embodiment of the invention additionally including ground fault protection.

Turning now in detail to FIG. 2 of the attached drawing, the components of FIG. 1 are included therein although somewhat different in arrangement; the same reference numerals will be employed where appropriate. In this embodiment, other components have been added to provide ground fault protection capabilities in the protective circuit device.

Interposed respectively in the line current conductors 17, 18 are two identical transformer primary windings 46, 48 disposed about a common core 52 of magnetically susceptible metal together with a secondary winding 50, thus forming a differential current sensing transformer. The core 52 is preferably of ferrite construction or tape wound and the primary windings 46, 48 are normally wound about the same portion of core 52 in the same direction with the same number of turns.

Equal current in the line conductors 17, 18 and therefore equal current in the primary windings 46, 48 results in magnetic flux being created in each primary winding which is of the same magnitude and in opposite directions because of the opposite directional current flow in the conductors 17, 18. Accordingly, there is zero magnetic flux because the flux of the two primary windings 46, 48 cancel out, and no electromotive force is induced in the secondary winding 50.

In the event that there is leakage from the load 16, the current flow in the primary windings 46, 48 will not be equal and a net magnetic flux will be produced which will cause a voltage to appear across the secondary winding 50. That voltage is the signal which is then amplified and utilized to trigger the circuitry which isolates the electrical load 16 in response to a ground fault.

The capacitor 54 is connected across the secondary winding 50 and is also connected on one side to the reference level of conductor 44 and on the other side to the diode 56 which rectifies the output of the secondary winding 50. Connected to the other side of the diode 56 in series relation to each other are the resistor 58 and the capacitor 60; the capacitor 60 is an integrator and filter for the output of the differential transformer secondary winding 50 and the resistor 58 limits current flow through the diode 58 into the capacitor 60 during circuit start-up conditions. The resistor 62 is positioned in parallel between the resistor 58 and the conductor 44 for the purpose of providing sensitivity adjustment for the circuit.

Additionally connected to one side of the diode 56 is the base 66 of the transistor 64 which is of the N-P-N type. The collector 70 of the transistor 64 is connected to the conductor 42 and the emitter 68 thereof transmits the amplified current leakage signal to the resistor 74. The connections to the resistor 74 have been described previously with respect to the overcurrent portions of the circuit as regards the embodiment of FIG. 1; thus, the signal is imparted to the silicon controlled rectifier 80.

To provide for test operation of the ground fault circuit the momentary push button switch 134 is connected in series with the resistor 136 between the conductors 17, 18. The momentary closing of the push button 134 allows passage of current through the primary winding 48 but it does not allow passage through the other primary winding 46, thereby simulating a difference in current between line conductors 17 and 18. The resistance value of the resistor 136 is sufficiently large so that there is insufficient current load to cause operation of the overcurrent portions of the circuit. During the test of the overcurrent portions of the circuit with the momentary push button 129 and the resistance 131, equal currents flow in the differential transformer primary windings 46, 48. The level of current flow is sufficient to operate the overcurrent portions of the circuit but the ground fault circuitry is not actuated because the current flow in primary windings 46, 48 is equal. The light 130 is connected to the terminals 124, 126 of triacs 114, 116, and when lighted, indicates that both triacs are in the conductive state. The capacitor 132 is positioned in parallel to the indicator light 130 to maintain normal triac operation in the absence of other loads. To provide for resetting of this embodiment a reset switch 140 is interposed in the conductor 17 between the input terminal 11 and the resistor 20.

Figure 3:
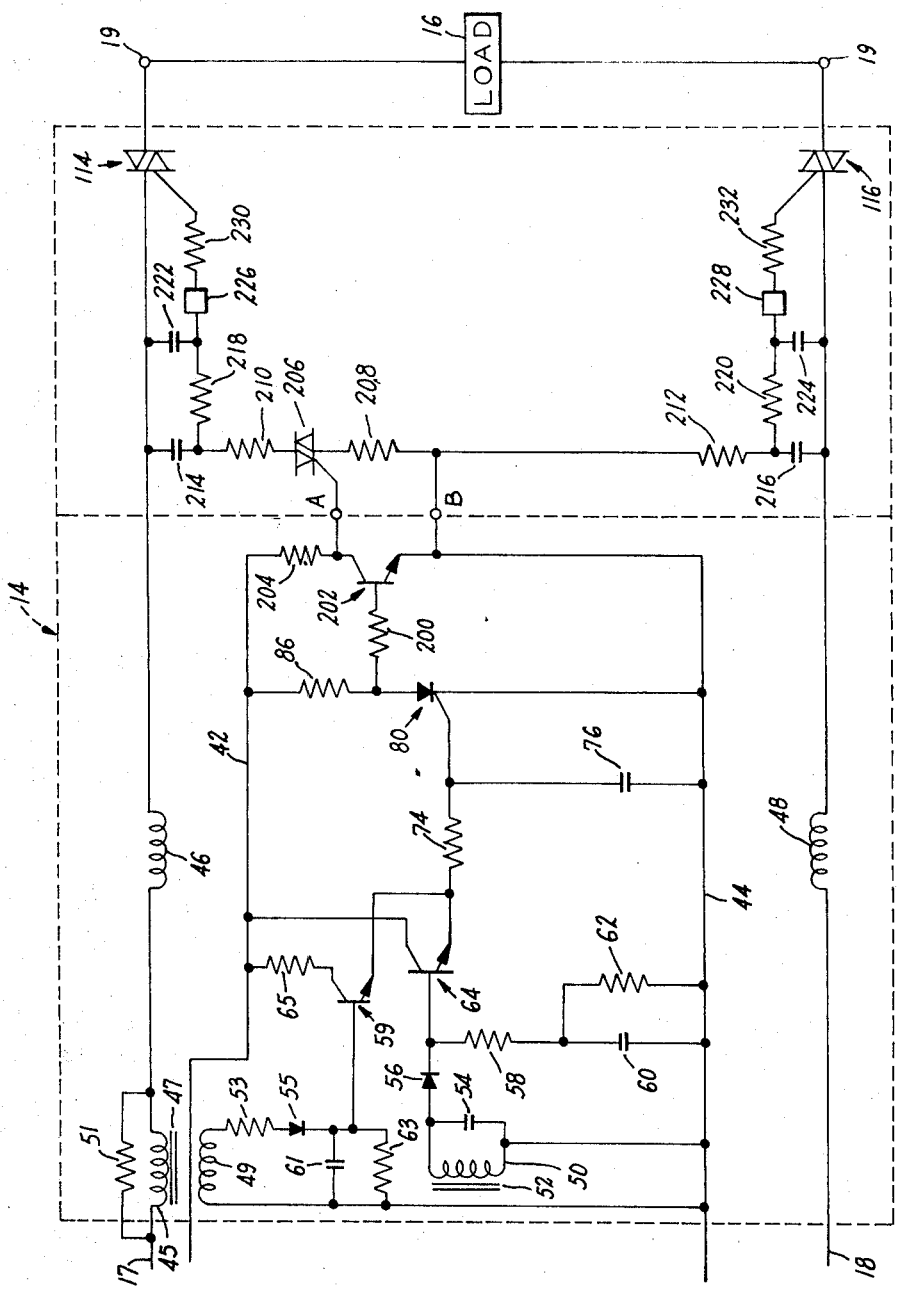
FIG. 3 is a circuit diagram of another embodiment utilizing a different form of gate drive.

Turning now to FIG. 3 of the attached drawings, the protective circuit device therein illustrated is essentially similar to that illustrated in FIG. 2 in that it provides both overcurrent and ground fault current protection. To the extent that components are repeated, the numerals employed in FIG. 2 are utilized in FIG. 3. However, the test circuitry and the power supply circuitry have been omitted for clarity of illustration and to avoid duplication, and this embodiment employs a different input signal generating means for driving the triacs which comprise the line switches.

Current from the fault detecting assembly circuit is transmitted through the base current limiting resistor 200 to the transistor 202. The resistor 204 supplies current to the transistor 202 when it is switched to the "on" state, or to the gate of the triac 206 when the transistor 202 has been switched to the "off" state. As will be appreciated, the transistor 202 thus will shut out the gate drive for the triac 200 when a fault is detected although the triac 206 will normally be maintained in a conductive state under normal operating conditions as the line voltage cycles through positive and negative phases.

The resistor 208 helps to maintain the triac 206 in the "off" or nonconductive state by preventing current splitting between the transistor 202 and the gate of the triac 206 when the transistor 202 has been turned on.

The resistors 210 and 212 control the magnitude of current supplied to the gate drive circuits of the line switch triacs 114, 116 and, in conjunction with the capacitors 214 and 216, also control the phase of the current supplied to the gate drives. The resistors 218, 220 in conjunction with the capacitors 222, 224 control the rate of rise of voltage at their respective junctions.

The bilateral trigger elements 226 and 228 become conductive when the voltage from the resistors 218, 220 exceeds predetermined levels which can be set in accordance with the rating of the device.

Cooperating with the resistors 218, 220 are capacitors 222 and 224 which thus serve to control the frequency of the pulse drive as well as the voltage of the pulse drive supplied to the gates of the triacs 114, 116. The resistors 230 and 232 control the amount of current flowing into the gate of the triacs 114, 116 as a result of the voltage developed across the resistors 218 and 220 and capacitors 222 and 224. In this manner, it can be seen that an AC gate current supply is utilized to provide proper operation of the triacs 114, 116 through an input signal sufficient to maintain them in an operative state during the period when the line voltage cycles through zero.

Figure 4:
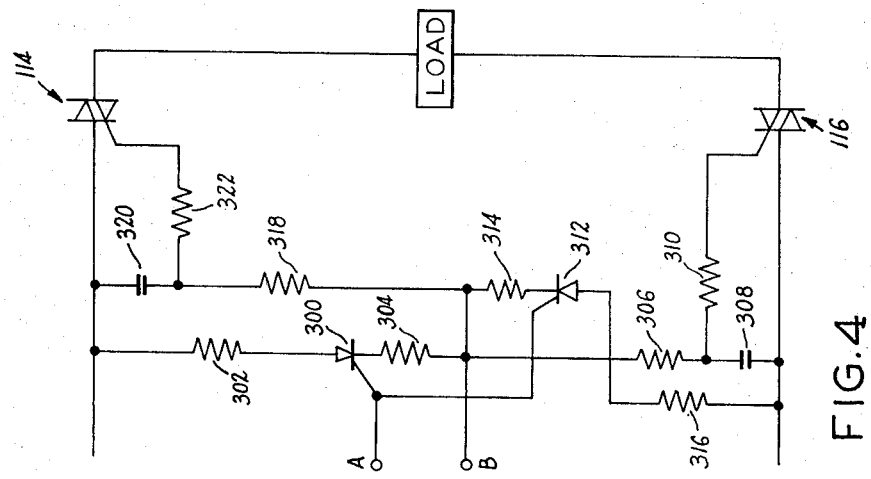
FIG. 4 is a fragmentary circuit diagram showing still another embodiment of gate drive.

Turning now in detail to FIG. 4 of the attached drawings, therein illustrated is a DC gate drive for the triac line switches substituting for the AC gate drive shown in FIG. 3. Other elements of the circuitry have been omitted for clarity of illustration and to avoid duplication. The DC drive circuitry of FIG. 4 is connected in at the terminals A, B of FIG. 3 and will be described fully from that point on.

The gate drive for SCRs 300, 312 is supplied through the line indicated by the terminal A during normal operation of the device. If a fault should occur and be sensed by the detecting mechanism (illustrated in FIGS. 1 and 2), the transistor 202 (shown in FIG. 3) serves to short out the gate drive for the SCRs 300, 312.

In its normally conductive state, the SCRs 300, 312 allow current to flow through the resistors 302, 306 to the capacitor 308, and the current flow will be in only one direction controlled by the polarity of the SCRs 300, 312. The voltage at the junction of the resistors 306, 318 and capacitors 308, 320 will be positive with respect to the one line (the lines on the opposite sides of the capacitors 308, 320). This positive voltage supplies a current controlled by the resistors 310, 322 to the gates of the triacs 114, 116. The resistors 304, 314 help to prevent current splitting.

Figure 5:
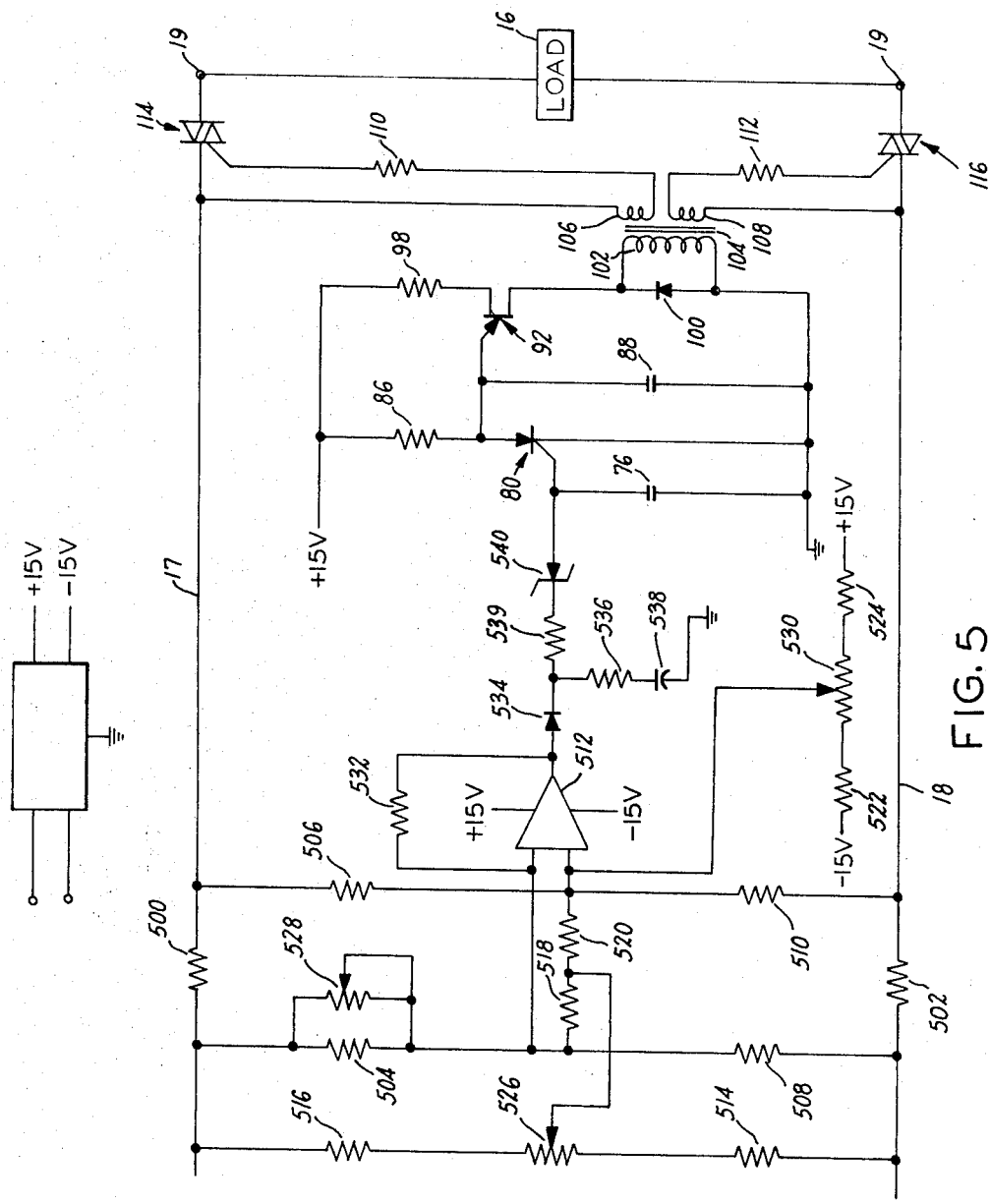
FIG. 5 is a fragmentary circuit diagram of a further embodiment utilizing a different ground fault sensing means.

Turning now to FIG. 5, therein illustrated is another form of ground fault sensing mechanism utilizing sensing resistors, voltage dividers and a differential amplifier. To the extent that elements of the circuitry are the same as those in previously illustrated embodiments, the numerals are repeated and will not be described herein.

In this embodiment, a pair of sensing resistors 500, 502 serve to produce voltages which are proportional to the line currents flowing through them. The resistors 504, 506, 508, 510 serve as voltage dividers by which the voltages across the resistors 500, 502 may be compared. The comparison is effected by the integrated circuit differential amplifier 512 (which is a single chip containing a multiplicity of miniaturized components).

Feedback resistor 532 controls the gate of the differential amplifier 512. The diode 534, resistor 536 and capacitor 538 rectify and filter the output of the differential amplifier 512 to produce a voltage at the junction of the diode 534 and resistor 536. The resistor 539 and zener diode 540 drive voltage from this junction and in turn supply current to the gate of the SCR 80 as in the embodiment of FIG. 2, from which point the circuitry is conveniently the same as that shown therein. The zener diode 540 will prevent false firing of the SCR 80 by avoiding rectification of spurious or noise voltages. As will be noted, this embodiment utilizes a ± 15 volt power supply in place of the power supply used in FIGS. 1 and 2.

Figure 6:
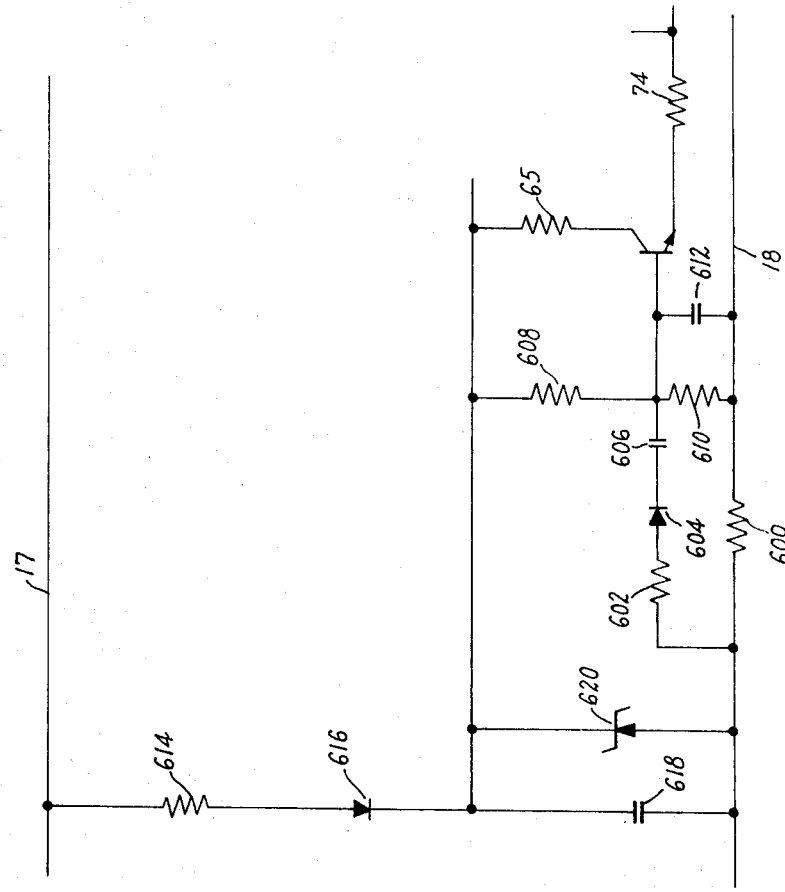
FIG. 6 is a fragmentary circuit diagram of a still further embodiment showing alternate overcurrent sensing means.

Turning now to the embodiment of FIG. 6, therein illustrated is another form of means for detecting excess or short circuit currents. In this embodiment the resistor 600 is located in one of the two lines (here designated A) and will sense the current flowing through that line. At a predetermined level at which the circuit protective device is to operate to discontinue current flow, it will generate sufficient voltage to turn on the transistor 59 by supplying base current through the resistor 602, diode 604 and capacitor 606. The resistor 602 serves to protect the base of the transistor 59 from excessive currents and the diode 604 rectifies the voltage across the resistor 600, thereby providing time averaging of the overcurrent in cooperation with the capacitor 612.

The resistors 608, 610 establish a bias level for the transistor 59; and the resistor 614, diode 616, capacitor 618 and zener diode 620 provide a DC power supply which is equivalent to the power supply illustrated in the block generally designated by the numeral 12 in FIGS. 1 and 2 of the drawings. It will be noted that this embodiment uses an unsymmetrical power supply in place of a balanced power supply as employed in FIGS. 1 and 2.

In each of the several illustrated embodiments, it will be seen that the operating components essentially comprise electronic and electrical elements which will react substantially instantaneously to faults in the current flowing through the circuit device. In each instance, the solid state switch in the line controls the current flowing through that line directly and not through any separate mechanical or electrical element, thus ensuring immediate response when its state is changed by the ancillary circuitry. In each instance, a selectively conductive silicon controlled rectifier or a triac (which is the equivalent of two SCRs) will cut off current flow to the gate drive input circuitry and latch in that condition in the event of a current fault.

OPERATION OF THE DEVICES

Turning first to FIG. 1 and to the operation of the embodiment which provides overcurrent protection only, connection of a source of line power to the input terminals 11, 11 energizes the line conductors 17, 18 and power supply 12.

During one-half of each line power cycle, the current will flow through resistor 20, diode 22, resistor 36, zener diodes 40 and 38, resistor 34, diode 26 and thence to resistor 21 back to the line power source 10. During the other half of each line power cycle, current will flow through resistor 21, diode 28, resistor 36, zener diodes 40 and 38, resistor 34, diode 24, and then to resistor 20 back to the source of line power 10. The capacitors 30, 32 are connected in series between the junction points of the diodes 22, 28 and the junction point of the diodes 24, 26 to provide a filtering of the bridge output.

The output of current transformer secondary winding 49 is rectified by the diode 55 whereupon the signal is altered by the RC network consisting of the resistor 63 and the diode 61. The current path through resistor 63 significantly reduces the charging rate for the capacitor 61 during periods when the signal from diode 55 is small but, when that signal becomes large in magnitude, the current flow through the resistor 63 is relatively small and capacitor 61 will charge more readily, thereby allowing a signal to pass to the base 57 of the transistor 59.

The signal applied to the base 57 determines the output from the emitter 61 of the transistor 59. That output is adjusted by means of the fixed resistor 74 and filtered by the capacitor 76 before passing to the gate 78 of the SCR 80. The signal applied to the gate 78 determines whether SCR 80 is conductive or non-conductive between the anode 84 and the cathode 82. When SCR 80 is conductive, the capacitor 88 is never charged through the resistor 86 and therefore the unijunction transistor 92 does not function and the triacs 114, 116 will be nonconductive. When no signal is applied to the gate 78 of SCR 80, it will not be conductive between the anode 84 and the cathode 82, and the capacitor 88 may be charged through the resistor 86 until the firing point of the unijunction transistor 92 is reached in a repetitious cyclical pattern to produce a pulse train in the pulse transformer primary winding 102 and thereby the secondary windings 106, 108 which causes triacs 114, 116 to become and stay conductive.

Current flowing in conductor 17 is divided between the resistor 51 and the transformer primary winding 45, which is coupled to the secondary winding 49. The output of the secondary winding 49 passes through the resistor 53 which limits its level before it passes through the diode 55 which rectifies the signal before it reaches the RC network consisting of the capacitor 61 and the resistor 63. The combination thereof provides the desired rapid response to very high current flow relative to a predetermined level or nominal rating for the protective device and a slower response to current only somewhat above the desired level.

The signal is then passed to the base 57 of the transistor 59 to control the signal from the emitter 61 thereof, which, in turn, is limited by the resistor 74 and filtered by the capacitor 76 before passing to the gate 78 of SCR 80. The values of the various components are selected to insure that normal current flow in the line conductor 17 does not trigger conduction of the SCR 80. Upon reaching a predetermined critical level, however, the current flow will cause the gate signal applied to the gate 78 of SCR 80 to reach a sufficient level to make that device conductive.

When the gate signal applied to the gate 78 is not of a level sufficient to make the SCR 80 conductive, but there is an over-current of lesser magnitude, the potential between the conductors 42 and 44 will cause the capacitor 88 to charge through the resistor 86 to the firing point level of the unijunction transistor 92. The resistor 86 allows sufficient current flow to charge capacitor 88 when SCR 80 is non-conductive and limits the current drain of the power supply when it is conductive. When the unijunction transistor 92 fires, the capacitor 88 is discharged through the emitter 90 to the base 94 and the pulse transformer primary winding 102. The cylical repetition of this series of events creates a pulse train which appears not only at the primary winding 102, but also at the secondary windings 106, 108, and thereby at the gates 118, 120 of the triacs 114, 116, causing them to remain in a conductive state. The use of an oscillator in this manner as opposed to a fixed bias results in a minimum power consumption to control the triacs 114, 116.

When the signal applied to gate 78 of SCR 80 reaches the minimum level required to make that device conductive between the anode 84 and cathode 82, the capacitor 88 will no longer charge. Accordingly, the unijunction transistor 92 will not reach its firing level and no pulse train is produced in pulse transformer windings 102, 106, 108. The triacs 114, 116 will not be conductive as a result, and output terminals 19 will be isolated from the input terminals 11.

The operation of the circuit protective device shown in FIG. 2 is similar to that of FIG. 1 except that the ground fault detection component circuitry may apply a signal to the gate 78 of SCR 80. More specifically, a difference in current flow between the primary windings 46, 48 produces a voltage across the secondary winding 50 of the differential transformer. This potential is rectified by the diode 56, integrated and filtered by the capacitor 60 and amplified by the transistor 64 before passing to the gate 78 of the SCR 80, thus producing operation of the protective circuit device to open the circuit.

Normal operation of either test switch 134 or 129 will cause SCR 80 to become conductive and cause triacs 114, 116 to go into a non-conductive state. The characteristics of the SCR 80 are such that, upon become conductive in response to the gate signal, it will continue to conduct so long as current flow continues between its anode 84 and cathode 82. In normal operation, the only way current flow may be interrupted between these points is by disconnecting the source of line power. In the embodiment of FIG. 1, this will entail disconnecting the conductors 17, 18 from the line power source 10, as for example, by removing a plug for the load providing device from a conventional house receptacle. In the embodiment of FIG. 2, the reset switch 140 in the conductor 17 may be opened temporarily to disconnect the elements of the device from the source 10 of line power to effect resetting. When disconnected from the line power source 10, the SCR 80 of the illustrated embodiments will return to its non-conductive state.

In the embodiment of FIG. 3, the operation is essentially the same as that in FIG. 2 although some of the components of the circuitry have been omitted for clarity of the illustration and to avoid unnecessary duplication. In this particular embodiment, the input signal to maintain the triac line switches in a given state is supplied by an AC gate drive.

Under normal operating conditions, the resistor 204 will supply current to the triac 206 which will therefore be in the "on" state and will be maintained in a conductive state during cycling of the voltage through positive and negative phases. The AC current derived from the line thus supplies the input signal to the gates of the triacs 114, 116 through the combinations of resistors, capacitors and trigger elements 226, 228.

When the fault is detected, the transistor 202 is turned on and shorts out the gate drive for the trail 206. This in turn terminates operation of the gate drive input signals to the triacs 114 and 116 and opens the circuit controlled thereby.

It will be appreciated that this line derived AC gate impulse supply illustrated in FIG. 3 permits proper operation of the triac line switches with a minimum amount of power drawn from the line. The phase shift elements of the circuit are set so as to supply voltage to the trigger elements 226, 228 during the period when the line voltage is cycling through zero at which time they will produce maximum pulse amplitude and frequency. Once the line switch triacs 114, 116 are turned on, they will stay on under load until the voltage cycles through the next crossover through zero at which time new pulses will initiate the "on" condition.

FIG. 4 is similar to FIG. 3 except that it employs a line derived DC gate drive to supply the input signal to the triacs to maintain them in the desired state.

In the embodiment of FIG. 5, the several resistors and potentiometers allow balancing and biasing of the voltages in the sensing resistors 500, 502 to permit the finite adjustment required to avoid spurious tripping. The differential amplifier 512 will amplify any differential voltage sensed while the zener diode 540 will prevent spurious or noise voltages from causing false firing.

In the embodiment of FIG. 6, the overcurrent detecting mechanism is similar to the sensing resistor mechanism employed for detecting ground faults in FIG. 5 except that the sensing is accomplished by a single resistor 600 in the line A. The resistor 600 is set so that a predetermined level of overcurrent will generate sufficient voltage to turn on the transistor 59. In this embodiment, a different DC voltage supply is employed as indicated in the drawing.

It will be appreciated that the essence of the present invention is based upon the use of solid state line switches in conjunction with selectively conducted silicon controlled rectifiers to produce almost essentially instantaneous opening of the line circuitry in response to a current fault. Although transistors and selectively conducted silicon controlled rectifiers may be used in various combinations to function as the line switch in addition to the control for the line switch, the preferred protective circuit devices employ triacs because of their highly effective operation, relatively low cost and facility for miniaturization.

It will be appreciated that the circuitry employed to detect the current faults can be other than those circuits specifically described and illustrated herein. The preferred devices because of reliability of operation, ease of construction and cost are the differential transformer for the ground fault detecting system and the current transformer for the overcurrent detecting mechanism, both as illustrated in FIGS. 1 and 2. If so desired, mechanical elements may be coupled with the electrical and electronic circuit elements of the present invention to permit opening of the circuit where there are sustained overcurrents of relatively low magnitude; among such devices are the conventional bimetal type elements employed in mechanical circuit breakers.

The source of the gate signal to the solid state switches may vary from those specifically illustrated and described herein. Other forms of pulse generating circuits not utilizing a unijunction type transistor include multivibrators, positive feedback amplifiers, tank-circuit sinusoidal oscillators with clipping and differentiating circuits, blocking oscillators, etc. The gate drives can be line derived AC either in phase or phase shifted. In one embodiment, a pulse generator such as illustrated in FIG. 1 may be utilized in conjunction with a phase shifted AC gate drive so as to peak when needed as the voltage cycles through zero.

Although the present invention has been illustrated and described with respect to a single phase circuit protection device, it will be readily appreciated that it is also adapted to polyphase circuits. Generally this will entail a separate transformer in each phase to provide the overcurrent protective circuitry in order to ensure adequate sensitivity. In such polyphase circuitry, there should be coaction between components in each of several phases to produce simultaneous opening. Moreover, it is apparent that significantly different arrangements of the components and different components may be used without departing from the spirit of the invention.

By the arrangement of components illustrated, the protective device may be calibrated and set to respond to predetermined levels of overcurrent and ground fault leakage, thus avoiding spurious action while at the same time ensuring essentially instantaneous action. The nominal rating of the protective device will determine the general values for the various components and adjustable components may provide precise calibration of the assembly. The capacitor charging the mechanism will provide operation when the overcurrent is relatively small but sustained, and a high overcurrent will produce instantaneous operation. When employed in conjunction with ground fault protective circuitry, a ground fault leakage will produce operation although it does not produce a current flow in excess of the nominal rating.

Thus, it can be seen from the foregoing detailed specification and drawings that the present invention provides a highly effective circuit protective device which is capable of sensitive response to circuit overcurrent and ground fault irregularities and which is relatively inexpensive to manufacture and operate. By being particularly adapted to use near the point where the electrical power is used (at the load) it avoids nuisance tripping and at the same time quickly and accurately responds to overcurrent and small leakage problems.

It will also be seen that a positive signal is required to render the solid state device conductive and, therefore, the failure of most components will cause the circuit to interrupt power. Accordingly, the design is of a failsafe nature. The relative simplicity of the circuitry makes the device reliable and simple to assemble, and the components may be selected to provide relatively long-lived, trouble-free operation.

Having thus described the invention, we claim:

1. A protective circuit device for detection and control of leakage from an associated electrical load and excessive current flow from a line power supply to an associated electrical load, comprising:
   a. a first pair of terminals for connection to an external associated alternating current line power supply;
   b. a second pair of terminals for connection to an external associated load;
   c. means connecting each of said first pair of terminals to a corresponding terminal of said second pair of terminals including at least one solid state line switch connecting one of said first pair of terminals and one of said second pair of terminals, said solid state switch having conductive and nonconductive states;
   d. means for changing the prevailing state of said solid state switch including means providing an input signal to said solid state switch to maintain one of such states, the state of said solid state switch changing upon termination of signal;
   e. means for sensing a fault in current flowing between at least one connected pair of terminals and operative to produce a signal upon a fault in current flow above a value established by the nominal rating of the protective circuit device;
   f. means connected to said fault sensing means and responsive to a signal from said current fault sensing means when said fault is in excess of the nominal rating of the protective circuit device and operative to terminate said input signal whereby a predetermined current fault will produce an operating signal and said responsive means will terminate the input signal to change the state of said solid state switch to open the circuit controlled thereby, and said responsive means including an electronic control member to prevent generation of said signal by change of state.

2. The protective circuit device of claim 1 wherein said fault sensing means senses current flow above a predetermined current rating.

3. The protective circuit device of claim 1 wherein said fault sensing means senses a leakage to ground in excess of a predetermined value.

4. The protective circuit device of claim 1 wherein said fault sensing means senses both current flow above a predetermined current rating and a leakage to ground in excess of a predetermined value.

5. The protective circuit device of claim 1 wherein said solid state switch is a triac and said electronic control member is a selectively conductive silicon controlled rectifier.

6. The protective circuit device of claim 1 wherein said solid state switch comprises a pair of transistors.

7. The protective circuit device of claim 1 wherein said solid state switch comprises a pair of selectively conductive silicon controlled rectifiers.

8. The protective circuit device of claim 1 wherein said input signal means includes a DC gate drive circuit.

9. The protective circuit device of claim 1 wherein said input signal means includes means supplying alternating current to the gate of said solid state switch from the line side of said protective device.

10. The protective circuit device of claim 1 wherein said input signal means includes a blocking oscillator generating an input pulse and a pulse transformer.

11. The protective circuit device of claim 3 wherein said fault sensing means includes a pair of sensing resistors, a pair of voltage dividers and a differential amplifier to sense current imbalance between the two lines representing a leakage to ground.

12. The protective circuit device of claim 2 wherein said fault sensing means includes a resistor in at least one of the lines and a transistor, said resistor sensing overcurrent in said line and operative to generate sufficient voltage to turn on said transistor.

13. A protective circuit device for detection and control of leakage from an associated electrical load and excessive current flow from a line power supply to an associated electrical load, comprising:
   a. a first pair of terminals for connection to an external associated alternating current line power supply;
   b. a second pair of terminals for connection to an external associated load;
   c. solid state switches connecting each of said first pair of terminals to a corresponding terminal of said second pair of terminals, said solid state switches having conductive and nonconductive states;
   d. means for changing the prevailing state of said solid state switches including means providing an input signal to said solid state switches to maintain one of such states, the state of said solid state switches changing upon termination of signal;
   e. means for sensing a fault in current flowing between at least one connected pair of terminals and operative to produce a signal upon a fault in current flow above a value established by the nominal rating of the protective circuit device, said fault sensing means being operative to sense both current flow above a predetermined current rating and a leakage to ground in excess of a predetermined value;

f. means connected to said fault sensing means and responsive to a signal from said current fault sensing means when said fault is in excess of the nominal rating of the protective circuit device and operative to terminate said input signal whereby a predetermined current fault will produce an operating signal and said responsive means will terminate the input signal to change the state of said solid state switches to open the circuit controlled thereby, and said responsive means including a selectively conductive silicon controlled rectifier to prevent generation of said input signal and which is normally nonconductive and becomes conductive upon a predetermined output in excess of said value to terminate said input signal and which latches in said conductive state.

14. The protective circuit device of claim 13 wherein said solid state switches are triacs.

15. The protective circuit device of claim 13 wherein said input signal means includes a DC gate drive circuit.

16. The protective circuit device of claim 13 wherein said input signal means includes means supplying alternating current to the gate of said solid state switch from the line side of said protective device.

17. The protective circuit device of claim 13 wherein said input signal means includes a blocking oscillator generating an input pulse and a pulse transformer.

18. The protective circuit device of claim 13 wherein said fault sensing means includes for the detection of a ground fault, a pair of sensing resistors, a pair of voltage dividers and a differential amplifier to sense current imbalance between the two lines representing a leakage to ground.

19. The protective circuit device of claim 13 wherein said fault sensing means includes a resistor in at least one of the lines and a transistor, said resistor sensing overcurrent in said line and operative to generate sufficient voltage to turn on said transistor.

20. The protective circuit device of claim 13 wherein said solid state switches are triacs and wherein said device includes at least one fuse.

* * * * *